United States Patent
Debart et al.

(10) Patent No.: US 11,916,259 B2
(45) Date of Patent: Feb. 27, 2024

(54) HOUSING FOR A BATTERY, AND METHOD FOR INTRODUCING AN EXTINGUISHING FLUID INTO SUCH A HOUSING

(71) Applicant: RENAULT s.a.s., Boulogne-Billancourt (FR)

(72) Inventors: Aurelie Debart, Pierregot (FR); Mathieu Legrand, Tourville la campagne (FR); Masato Origuchi, Rambouillet (FR); Natalie Rat, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 141 days.

(21) Appl. No.: 17/438,233

(22) PCT Filed: Mar. 12, 2020

(86) PCT No.: PCT/EP2020/056683
§ 371 (c)(1),
(2) Date: Sep. 10, 2021

(87) PCT Pub. No.: WO2020/182953
PCT Pub. Date: Sep. 17, 2020

(65) Prior Publication Data
US 2022/0216577 A1    Jul. 7, 2022

(30) Foreign Application Priority Data
Mar. 13, 2019   (FR) ..................................... 1902568

(51) Int. Cl.
*H01M 50/627*     (2021.01)
*A62C 3/16*       (2006.01)
(Continued)

(52) U.S. Cl.
CPC ............. *H01M 50/627* (2021.01); *A62C 3/16* (2013.01); *H01M 50/148* (2021.01);
(Continued)

(58) Field of Classification Search
CPC ............. H01M 50/627; H01M 50/202; H01M 50/262; H01M 50/159; H01M 50/204;
(Continued)

(56) References Cited

U.S. PATENT DOCUMENTS

| 2012/0000548 A1* | 1/2012 | Khamitkar .......... F16K 17/1606 137/68.25 |
| 2015/0079426 A1* | 3/2015 | Chen .................... H01M 50/308 429/53 |
| 2018/0269440 A1 | 9/2018 | Lee et al. |

FOREIGN PATENT DOCUMENTS

| EP | 2 624 332 A1 | 8/2013 |
| EP | 3 352 243 A1 | 7/2018 |
| JP | 2013-136266 A | 7/2013 |

OTHER PUBLICATIONS

International Search Report dated May 12, 2020 in PCT/EP2020/056683 filed on Mar. 12, 2020, 2 pages.
(Continued)

*Primary Examiner* — Jane J Rhee
(74) *Attorney, Agent, or Firm* — Oblon, McClelland, Maier & Neustadt, L.L.P.

(57) ABSTRACT

A housing for a battery includes an envelope and at least one rupture device provided with a rupture cap. The rupture device is mounted at the location of an opening formed in the envelope. The rupture cap breaks when an excess pressure is exerted on its outer surface situated on the outer side of the housing.

20 Claims, 2 Drawing Sheets

(51) Int. Cl.
*H01M 50/148* (2021.01)
*H01M 50/159* (2021.01)
*H01M 50/202* (2021.01)
*H01M 50/204* (2021.01)
*H01M 50/233* (2021.01)
*H01M 50/262* (2021.01)

(52) U.S. Cl.
CPC ....... *H01M 50/159* (2021.01); *H01M 50/202* (2021.01); *H01M 50/204* (2021.01); *H01M 50/233* (2021.01); *H01M 50/262* (2021.01); *H01M 2200/20* (2013.01)

(58) Field of Classification Search
CPC ............. H01M 50/233; H01M 50/148; H01M 2200/20
See application file for complete search history.

(56) References Cited

OTHER PUBLICATIONS

French Preliminary Search Report (with English translation of Categories of Cited Documents) dated Nov. 27, 2019 in French Application 1902568 filed on Mar. 13, 2019, 3 pages.

* cited by examiner

HOUSING FOR A BATTERY, AND METHOD FOR INTRODUCING AN EXTINGUISHING FLUID INTO SUCH A HOUSING

BACKGROUND

The invention relates to a housing for a battery. The invention relates also to a battery pack comprising such a housing. The invention relates also to a motor vehicle comprising such a housing. The invention relates also to a method for manufacturing such a housing. The invention relates finally to a method for introducing an extinguishing fluid into such a housing.

Some motor vehicles, notably the electric or hybrid powered vehicles, comprise a power supply battery for supplying electrical energy to the electric motor, notably the drive motor.

A power supply battery of an electric or hybrid powered vehicle is, for example, of lithium-ion (Li-ion) type. Such a battery comprises electrochemical cells comprising an electrolyte. Such a battery generally comprises several battery modules or sets of electrochemical cells. The battery is surrounded by a housing.

Such power supply batteries of an electric or hybrid powered vehicle can ignite, notably in the case of a vehicle fire, for example following a road accident or an act of vandalism, or, very highly improbably, following an internal failure of the battery. The very great release of heat in proximity to the battery can trigger a thermal runaway phenomenon inside the electrochemical cells. They can then in turn ignite inside the battery. Such a fire of chemical origin is very difficult to extinguish, especially if it is confined in the housing of the battery. The result thereof is a risk of the battery exploding. Furthermore, the electrochemical cells can emit toxic and flammable liquids and/or gases.

To extinguish a fire of such a battery, one solution consists in "quenching" the battery by injecting an extinguishing fluid, notably water, inside the housing of the battery.

The document FR2987701 discloses a device by which firefighters can fill a traction battery of an electric or hybrid motor vehicle, which makes it possible to introduce an extinguishing fluid into the battery as soon as the hatch blocking means have been removed or have melted.

However, this solution presents drawbacks. In particular, the opening of the hatch blocking means is often done under the effect of the heat without being able to precisely control the instant of opening. The fact of being able to precisely control the instant of opening can however be useful in certain situations in order to avoid a premature opening, resulting in the entry into the vehicle interior of fumes and fire, which are no longer contained in the battery.

BRIEF SUMMARY

The aim of the invention is to provide a housing for a battery and a method for introducing an extinguishing fluid into such a housing that remedy the above drawbacks and enhance the battery fire extinguishing devices and methods known from the prior art. In particular, the invention makes it possible to produce a housing for a battery of a motor vehicle and a method for introducing an extinguishing fluid into such a housing that make it possible to preserve the safety of the passengers of the vehicle by preventing fumes and fire from entering into the vehicle interior for as long as possible, and by withstanding the high temperatures from a battery fire.

According to the invention, a housing for a battery comprises an enclosure and at least one rupture device provided with a rupture cap, the rupture device being mounted at the location of an opening formed in the enclosure, the rupture cap being configured to break when an overpressure is exerted on its outer surface situated on the outside of the housing.

The rupture cap can be of concave form on the inside of the housing and of convex form on the outside of the housing.

The rupture cap for example takes the form of a disk.

The rupture cap is for example made of steel, for example of 316 type stainless steel.

The rupture device can further comprise an inner support and an outer support, the rupture cap being inserted between the inner support and the outer support, the inner support being positioned against a peripheral portion of the inner surface of the rupture cap and the outer support being positioned against a peripheral portion of the outer surface of the rupture cap, the inner support and the outer support being holed so as to expose a central portion of the rupture cap.

The inner support is for example made of steel, for example of 316 type stainless steel.

The outer support is for example made of steel, for example of 316 type stainless steel.

The housing can further comprise a means for fixing the rupture device to the enclosure of the housing.

The fixing means can comprise a fixing piece obtained by a drawing-type method.

Said fixing piece is for example made of steel, for example of DX56 type steel.

The housing can further comprise a seal, notably of O-ring seal type, intended to be positioned between said fixing piece and the enclosure of the housing.

The fixing means can further comprise, for the fixing of the fixing piece to the enclosure of the housing:

at least one fixing system comprising a stud and a nut, for example a seal-tight fixing system of RIVKLE type; or at least one screw.

The invention also relates to a battery pack, notably supplying power to an electric or hybrid motor vehicle, comprising a housing as defined previously.

The invention also relates to a motor vehicle, notably an electric or hybrid powered motor vehicle, comprising a power supply battery pack as defined previously or a housing as defined previously.

The invention relates also to a method for manufacturing a housing as defined previously, comprising a step of welding, notably by laser, of the inner support and of the outer support to the rupture cap of the rupture device.

The method can comprise:

a step of welding, notably by laser, of the fixing piece to the rupture device; and/or a step of cataphoresis of at least the fixing piece and optionally of the rupture device.

The invention relates finally to a method for introducing an extinguishing fluid into a housing as defined previously, comprising a step of application of an overpressure to the rupture device so as to cause the rupturing of the rupture cap.

The overpressure can be obtained by a force exerted by water ejected from a fire nozzle and directed toward the rupture device.

BRIEF DESCRIPTION OF THE DRAWINGS

The attached drawings represent, by way of example, an embodiment of a housing according to the invention.

DETAILED DESCRIPTION

Figure 1:
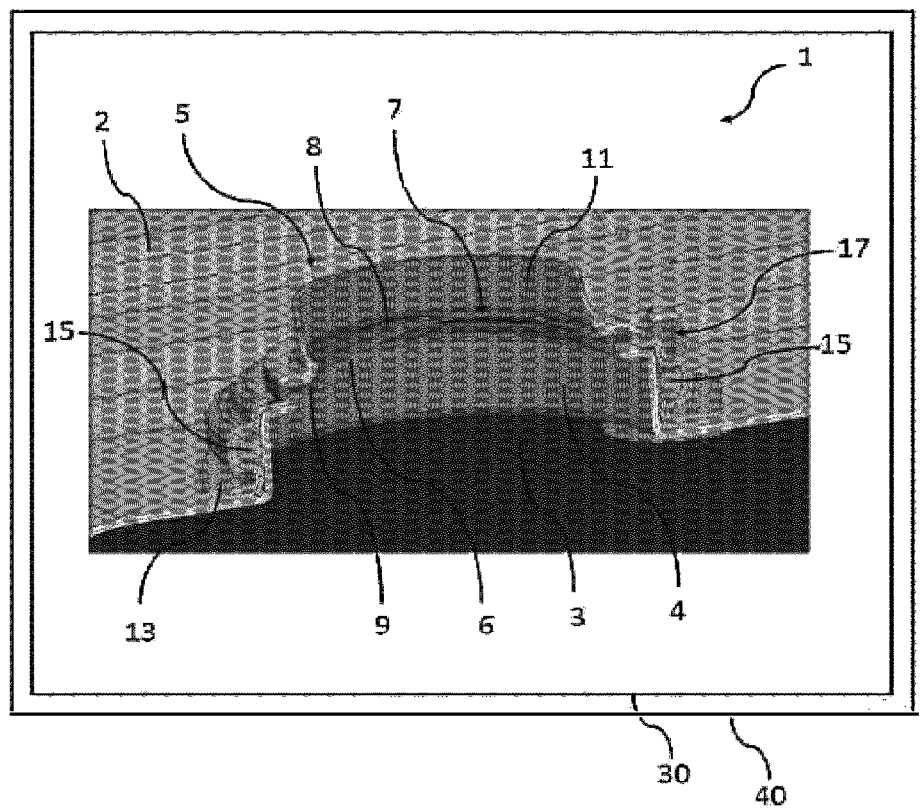
FIG. 1 is a perspective cross-sectional view partially representing an embodiment of a housing for a battery.

The invention proposes providing a housing of a battery with a rupture cap configured to break when an overpressure is exerted on its surface situated on the outside of the housing. The invention makes it possible, in case of a battery fire, to use a force exerted by water ejected from a fire nozzle and directed toward the rupture cap to break it and introduce an extinguishing fluid inside the housing.

An embodiment of a housing 1 for a battery is described hereinbelow with reference to FIGS. 1 and 2.

The housing 1 is intended to surround and/or serve as enclosure, notably protective enclosure, for a battery. Such a battery is for example a power supply battery of an electric or hybrid powered vehicle. Such a battery is for example of lithium-ion (Li-ion) type.

"Battery" is understood to mean a battery or a set of battery modules.

"Battery pack" is understood to mean a set comprising a housing and at least one battery positioned inside the housing.

"Inner" or "internal" surface or wall is understood to mean a surface or wall situated on the inside of, or facing the interior of, the housing 1. "Outer" or "external" surface or wall is understood to mean a surface or wall situated on the outside of the housing 1.

"Normal use" or "normal usage" of the housing 1 is understood to mean a use or usage of the housing 1 in the absence of localized or extensive fire, notably when the battery is operating normally.

The housing 1 comprises an enclosure 2, or casing. The enclosure 2 is for example the top casing of a battery.

The housing 1 comprises a rupture device 5 intended to be mounted at the location of an opening 3 formed in the enclosure 2.

In normal usage of the housing 1, the rupture device 5 is intended to block or hermetically seal the opening 3 of the enclosure 2. In the event of fire, the rupture device 5 is intended to break, in a controlled way and at a well chosen instant, under the effect of a force exerted by an extinguishing fluid, notably water, ejected from a fire nozzle, which makes it possible to free the opening 3 and introduce the extinguishing fluid inside the housing 1.

Preferably, the opening 3 can be of circular form. Other forms may also be provided for the opening 3, for example oblong or rectangular.

The diameter of the opening 3 will be able to be chosen so as to substantially match the diameter of the water jet from a fire nozzle.

Advantageously, the enclosure 2 has a portion 4 in chimney form at the location of the opening 3. The portion 4 is preferably substantially perpendicular to the surface of the portion of the enclosure 2 from which it extends.

Advantageously, the rupture device 5 and the corresponding opening 3 are situated at a location of the enclosure 2 that is directly accessible from the outside of the vehicle. The result thereof is that the firefighters, in the event of a fire, can fill the housing 1 with an extinguishing fluid without having to get too close to the vehicle.

The rupture device 5 comprises a rupture cap 7.

The rupture cap 7 comprises an inner surface 6 facing the interior of the housing 1 or situated on the inside of the housing 1. The rupture cap 7 comprises an outer surface 8 opposite the inner surface 6. The outer surface 8 of the rupture cap 7 is situated on the outside of the housing 1.

In normal usage of the housing 1, the rupture cap 7 is intended to block the opening 3. The rupture cap 7 corresponds also to the portion of the rupture device 5 that is intended, in the event of fire, to break, in a controlled way and at a well chosen instant, under the effect of an overpressure exerted on its outer surface 8 situated on the outside of the housing.

The rupture cap 7 is configured to break when an overpressure is exerted on its outer surface 8 situated on the outside of the housing.

The rupture cap 7 for example takes the form of a disk. "Disk" is understood to mean a flat disk or a domed disk.

Advantageously, the rupture cap 7 takes the form of a dome.

Advantageously, the rupture cap 7 is of concave form on the inside of the housing 1 and of concave form on the outside of the housing 1. The rupture cap 7 is mounted so as to break when an overpressure is exerted on its outer surface 8.

Preferably, a material resistant to the high temperatures resulting from a battery fire will be chosen for the rupture cap 7.

Advantageously, a material that has insulating properties with respect to the electromagnetic interferences emitted or undergone by the internal elements of the housing 1 will be chosen for the rupture cap 7. The result thereof is that such a rupture cap 7, in addition to its role as blocking means for the opening 3 and therefore its role of containment inside the housing 1, also serves as electromagnetic shielding in the normal usage of the housing 1.

The rupture cap 7 is for example made of stainless steel, for example of 316 type stainless steel.

The diameter of the rupture cap 7 is for example between 25 mm and 200 mm. The thickness of the rupture cap 7 is for example between 1 micrometer and 10 mm.

Diameter of the rupture cap 7 is understood to mean the dimension of the inner 6 and the outer 8 surfaces. Thickness of the rupture cap 7 is understood to mean the dimension of the rupture cap 7 in a direction substantially at right angles to inner 6 and outer 8 surfaces.

The material or materials and the dimensions of the rupture cap 7 will notably be chosen such that the rupture cap 7 can break in the case of a force exerted on the outer surface 8 of the rupture cap 7 by the water jet from a firefighter by a fire nozzle, corresponding for example to a pressure of the order of 6 bar at the fire truck.

According to an exemplary embodiment, the rupture cap 7 can be made of stainless steel, and have a diameter of the order of 60 mm and a thickness of the order of 5 micrometers, and can be gauged to break or open under a pressure of the order of 700 mbar, that is to say when the difference between the pressure outside the housing and the pressure inside the housing exceeds a threshold of the order of 700 mbar.

Advantageously, the rupture cap 7 comprises at least one groove 20, called median groove, and/or at least one groove 22, called peripheral groove. The grooves 20, 22 correspond to lines of embrittlement of the rupture cap 7. The rupture cap 7 is notably intended to fracture or break along the groove or grooves 20, 22.

The groove 22 is, for example, a groove running along the periphery or the perimeter of the rupture cap 7. The groove 20 extends, for example, substantially along a median portion of the rupture cap 7, between two diametrically opposite points on the perimeter or close to the perimeter of the rupture cap 7.

Advantageously, a median groove 20 extends between two diametrically opposite points of a peripheral groove 22.

The rupture device 5 can further comprise an inner support 9 and an outer support 11, the rupture cap 7 being inserted between the inner support 9 and the outer support 11.

The inner support 9 is positioned against a peripheral portion or edge or perimeter of the inner surface 6 of the rupture cap 7. The outer support 11 is positioned against a peripheral portion or edge or perimeter of the outer surface 8 of the rupture cap 7.

The inner support 9 and the outer support 11 of the rupture device 5 are preferably holed so as to expose a central portion of the rupture cap 7 and allow the introduction of an extinguishing fluid inside the housing 1 once the rupture cap 7 is fractured.

The inner support 9 is, for example, of annular form.

The outer support 11 preferably has a central opening that makes it possible to directly expose a central portion of the rupture cap 7 to an extinguishing fluid under pressure, in case of fire.

The outer support 11 of the rupture device 5 for example takes the form of a chimney.

The exposed portion of the rupture cap 7 is intended to break when an overpressure exerted by an extinguishing fluid on its outer surface 8 has a threshold or predetermined minimum value. The threshold or predetermined minimum value of the overpressure can be chosen according to the application, the opening means available and the internal back pressure that the device must withstand. According to an exemplary embodiment, the threshold or predetermined minimum value of the overpressure can be of the order of 700 mbar.

Advantageously, the inner support 9 and the outer support 11 are fixed hermetically or tightly on either side of the rupture cap 7. The result thereof is that the rupture device 5, comprising the rupture cap 7 and the inner 9 and outer 11 supports, has a function of containment, notably of fluids, inside the housing 1.

The inner support 9 and the outer support 11 are, for example, made of the same material, for example of the same material as the rupture cap 7.

Preferably, one or more materials resistant to the high temperatures resulting from a battery fire and that exhibit electromagnetic shielding properties will be chosen for the inner support 9 and the outer support 11.

The inner support 9 and the outer support 11 are, for example, made of stainless steel, for example of 316 type stainless steel.

The housing 1 can further comprise a means of fixing the rupture device 5 to the enclosure 2.

The fixing means comprises, for example, a fixing piece 13. The fixing piece 13 is, for example, obtained by a drawing-type method.

The fixing piece 13 is notably intended to ensure the seal-tightness between the rupture device 5 and the enclosure 2 of the housing 1.

Advantageously, the form of the fixing piece 13 can be configured so as to surround the outer wall of the chimney 4 of the enclosure 2. The fixing piece 13 is positioned against the outer surface of the chimney 4.

The fixing piece 13 is, for example, of annular form.

Advantageously, the form of the fixing piece 13 can be configured so as to be able to position a seal 15 between the fixing piece 13 and the enclosure 2. Preferably, the seal 15 is positioned against the fixing piece 13 and the chimney 4 of the enclosure 2.

The seal 15 is, for example, an O-ring seal.

The seal 15 is for example made of ethylene-propylene-diene monomer, commonly designated by the acronym EPDM, or of nitrile butadiene rubber, commonly designated by the acronym NBR.

The rupture device 5 and the fixing piece 13 notably make it possible to close the opening 3 of the enclosure 2 of the housing 1 hermetically, in normal usage or use of the housing 1.

Preferably, a material resistant to the high temperatures resulting from a battery fire will be chosen for the fixing piece 13.

The fixing piece 13 is, for example, made of steel, for example of DX56 type steel.

The fixing piece 13 can be mounted, via a system comprising at least one welded stud and a nut, for example via a seal-tight system of RIVKLE type, or else via one or more screws 17, depending on the possibilities, on the enclosure 2 of the housing 1. A stud is, for example, welded onto the fixing piece 13 or directly incorporated in the housing 1.

One advantage of a housing of the type of that described above is linked to the fact that the rupture device 5 forms, in the normal use of the housing 1, an electromagnetic shielding that is efficient and simple to implement. The rupture device 5 allows access to the interior of the housing 1 to be made possible in the event of fire while serving as insulation against the electromagnetic interferences emitted or sustained by the internal elements of the housing 1 in normal usage.

The invention also relates to a battery pack 30 comprising a housing 1 of the type of that described above. The battery pack 30, for example, further comprises at least one battery, notably supplying power to an electric or hybrid motor vehicle.

The invention further relates to a motor vehicle 40, notably an electric or hybrid powered motor vehicle, comprising a housing 1 of the type of that described above or a battery pack 30 of the type of that described above.

Another advantage of a housing of the type of that described above lies in the fact that it makes it possible, in the event of a battery fire, to prevent fumes and fire from entering into the vehicle interior by withstanding the high temperatures of the fumes and of the fire. The result thereof is increased passenger safety.

A housing of the type of that described above for example makes it possible to prevent the entry of fumes and fire into the vehicle interior for at least 5 minutes after a thermal runaway of a battery has been detected. That allows the passengers to exit or be extracted from the vehicle before the fumes and fire enter into the vehicle interior.

Another advantage of a housing of the type of that described above lies in the fact that it makes it possible to provide an effective device for introducing an extinguishing fluid into a housing of a battery, useful to the firefighters in the case of a fire, while enhancing the efficiency of the electromagnetic shielding in normal usage, compared to the battery fire extinguishing devices known from the prior art.

A mode of execution of a method for manufacturing or mounting a housing 1 for a battery of the type of that described above is described hereinbelow.

An opening 3 is formed in the enclosure 2 of the housing 1, notably by drilling.

The inner support 9 and the outer support 11 are fixed on either side of the rupture cap 7 of the rupture device 5, for example by welding, notably by a laser-type method.

One advantage linked to a step of welding, notably by laser, of the inner support 9 and of the outer support 11 onto the rupture cap 7 of the rupture device 5 lies in the fact that the inner 9 and outer 11 supports are tightly fixed to the rupture cap 7.

The fixing piece 13 is fixed, for example, by welding, notably by a laser-type method, onto the rupture device 5, comprising the assembly of the rupture cap 7 and of the inner 9 and outer 11 supports.

A deposition of a paint, for example by electrophoresis, notably by cataphoresis or cationic electrodeposition, can be performed at least on the fixing piece 13, and optionally on the rupture device 5.

A cataphoresis step is notably particularly advantageous in the case where the fixing piece 13 is made of DX56 type steel.

A deposition of a paint, for example by electrophoresis, notably by cataphoresis or cationic electrodeposition, can also be performed on at least a part of the rupture device 5, for example simultaneously with the deposition on the fixing piece 13.

One advantage of a method for manufacturing a housing for a battery of the type of that described above is linked to the fact that it is simple to implement and has a low cost.

A mode of execution of a method for introducing an extinguishing fluid into a housing for a battery of the type described above is described hereinbelow. Such a method can, for example, be used by firefighters to extinguish a battery fire.

The invention proposes a method that makes it possible, in case of a battery fire, to use the force exerted by the jet from a fire nozzle to cause the rupture cap 7 of the rupture device 5 to rupture and thus free the opening 3 of the enclosure 2 of the housing 1. The result therefore is that direct access to the interior of the housing 1 is cleared for the firefighters to be able to fill the housing 1 with an extinguishing fluid, notably water, and "quench" the battery to extinguish the fire.

The method comprises a step of application of an overpressure on the rupture device 5 so as to cause the rupture cap 7 to rupture.

The overpressure is, for example, obtained by a force exerted by water ejected from a fire nozzle and directed toward the rupture device 5.

The exposed portion of the rupture cap 7 breaks when the pressure of the extinguishing fluid exhibits a threshold or predetermined minimum value. The threshold or predetermined minimum value of the overpressure can be chosen according to the application, the opening means available and the internal back pressure that the device must withstand. According to an exemplary embodiment, the threshold or predetermined minimum value of the overpressure can be of the order of 700 mbar.

The rupture cap 7 which has broken makes it possible to free at least a portion of the opening 3, which allows the introduction of the extinguishing fluid into the housing 1.

The extinguishing fluid can be introduced into the housing 1 as soon as the rupture cap 7, which formed the blocking means blocking the opening 3 of the enclosure 2 of the housing 1, has been broken.

A pressure is exerted by the extinguishing fluid on the outer surface 8, of convex form, of the rupture cap 7. The result thereof is that the rupture cap 7 breaks or tears or fractures under the effect of the inversion thereof, as is described in the document EP1710479. The rupture cap 7, of convex form, is inverted under the effect of the pressure and tears along a line preweakened to contact from a cutting element. Other variants exist, notably by simple gauging of the thickness of the rupture cap to withstand a predefined pressure, and could be used.

One advantage of a method for introducing an extinguishing fluid into a housing for a battery of the type described above lies in the fact the firefighters can extinguish a battery fire while remaining at a certain distance from the vehicle or from the housing. The result thereof is that the intervention of the firefighters is less risky.

Another advantage of a method for introducing an extinguishing fluid of the type of that described above lies in the fact that it makes it possible to use the force exerted by a water jet from a fire nozzle in its most commonly used state, for example corresponding to a pressure of the order of 6 bar at the fire truck. A water jet from a fire nozzle exhibiting such a pressure is commonly used by all firefighters around the world. The result thereof is that such a method does not require any particular provision for the firefighter equipment.

Another advantage of a method for introducing an extinguishing fluid of the type of that described above lies in the fact that the freeing of the opening 3 of the enclosure 2 of the housing 1 is done in a controlled way. Such control of the instant of freeing of the opening makes it possible to avoid the entry into the vehicle interior of fumes and/or fire contained in the battery, before any passengers have been able to exit from the vehicle.

Figure 2:
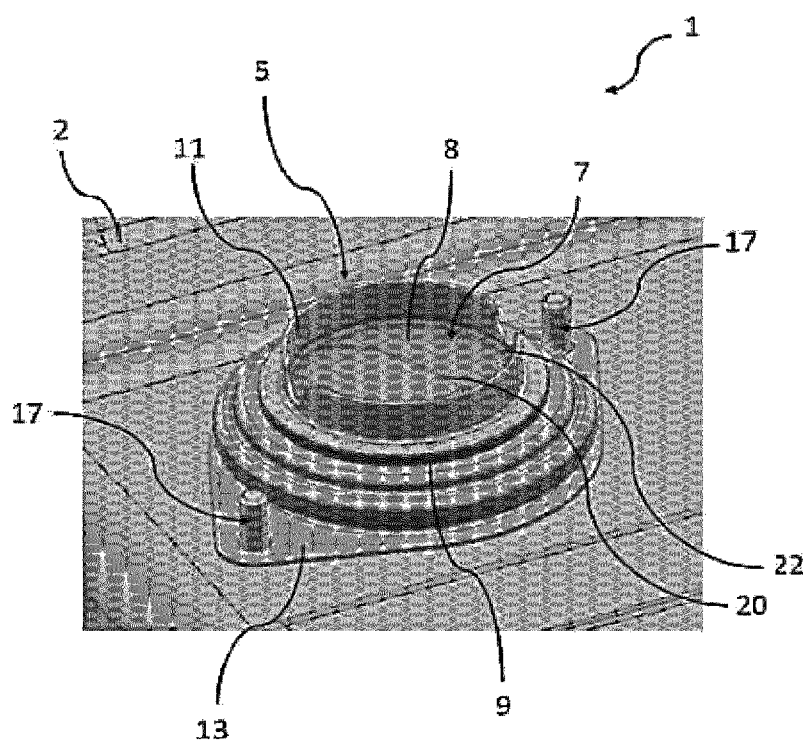
FIG. 2 is a top view partially representing an embodiment of a housing for a battery.

A housing 1 comprising a rupture device 5 has been described in relation to FIGS. 1 and 2. Obviously, a number of rupture devices 5, and a number of associated openings 3, will be able to be provided for one and the same housing 1. That would make it possible to optimize, for the firefighters, the rapid and simple access to at least one rupture device 5, for example in the case of a road accident.

As a variant, a housing 1 for a battery of the type of that described above could also comprise other devices, called "fireman access" devices, allowing access to the interior of the housing 1 for the introduction of an extinguishing fluid by the firefighters, for example the "fireman access" devices designate both the concept of rupture cap presented here and devices comprising a thermo-fusible zone, notably positioned alongside the interface with the chassis of the vehicle.

A housing 1, notably intended to surround a power supply battery of a motor vehicle, notably a battery of lithium-ion (Li-ion) type, has been described in relation to FIGS. 1 and 2. Such a housing 1 will be able to be used for all applications comprising a battery with flammable electrolyte, notably in the motor vehicle, fixed energy storage and aviation fields.

A method for introducing an extinguishing fluid into a housing 1 for a battery has been described above in the case of the use of water as extinguishing fluid. Obviously, extinguishing fluids other than water will be able to be used.

The invention claimed is:

1. A housing for a battery, comprising:
   an enclosure;
   at least one rupture device provided with a rupture cap, the rupture device being mounted at a location of an opening formed in the enclosure, the rupture cap being configured to break when an overpressure is exerted on its outer surface situated on an outside of the housing; and
   an inner support and an outer support, the rupture cap being inserted between the inner support and the outer support, the inner support being positioned against a peripheral portion of the inner surface of the rupture cap and the outer support being positioned against a peripheral portion of the outer surface of the rupture cap, the inner support and the outer support being holed so as to expose a central portion of the rupture cap, and the outer support including a cylindrical wall extending in a direction away from the rupture cap.

2. The housing as claimed in claim 1, wherein the rupture cap is of concave form on an inside of the housing and of convex form on the outside of the housing.

3. The housing as claimed in claim 1, wherein the rupture cap takes the form of a disk.

4. The housing as claimed in claim 1, wherein the rupture cap is made of steel.

5. The housing as claimed in claim 1, wherein the rupture cap is made of 316 type stainless steel.

6. The housing as claimed in claim 1, wherein the inner support is made of steel and/or the outer support is made of steel.

7. The housing as claimed in claim 6, wherein the steel is 316 type stainless steel.

8. The housing as claimed in claim 1, further comprising means for fixing the rupture device to the enclosure of the housing.

9. The housing as claimed in claim 8, wherein the fixing means comprises a fixing piece obtained by a drawing-type method.

10. The housing as claimed in claim 9, wherein said fixing piece is made of steel.

11. The housing as claimed in claim 9, wherein said fixing piece is made of DX56 type steel.

12. The housing as claimed in claim 9, further comprising a seal configured to be positioned between said fixing piece and the enclosure of the housing.

13. The housing as claimed in claim 9, wherein the fixing means further comprises, to fix the fixing piece to the enclosure of the housing:
at least one fixing system comprising a stud and a nut; or
at least one screw.

14. A battery pack, comprising:
the housing as claimed in claim 1.

15. A motor vehicle, comprising:
the battery pack as claimed in claim 14.

16. A method for manufacturing the housing as claimed in claim 1, comprising:
welding the inner support and the outer support onto the rupture cap of the rupture device.

17. A method for manufacturing the housing as claimed in claim 9, comprising:
welding the fixing piece to the rupture device; and/or
cataphoresis of at least the fixing piece.

18. A method for introducing an extinguishing fluid into the housing as claimed in claim 17, comprising:
applying an overpressure to the rupture device so as to cause the rupturing of the rupture cap.

19. The method as claimed in claim 18, wherein the overpressure is obtained by a force exerted by water ejected from a fire nozzle and directed toward the rupture device.

20. The housing as claimed in claim 13, wherein the cylindrical wall of the outer support extends further away from the rupture cap than the stud, the nut, or the at least one screw of the fixing means.

* * * * *